United States Patent

[11] 3,547,253

| [72] | Inventor | Paul A. Ford |
| | | 29753 Somerset, Southfield, Mich. 480750 |
| [21] | Appl. No. | 801,654 |
| [22] | Filed | Feb. 24, 1969 |
| [45] | Patented | Dec. 15, 1970 |

[54] ELEVATING STRUCTURE HAVING CHAIN AND BAR DRIVEN RECIPROCATING MEANS
11 Claims, 5 Drawing Figs.

[52] U.S. Cl. ................................................ 198/219
[51] Int. Cl. ......................................... B65g 25/04
[50] Field of Search .......................................... 198/218, 219

[56] References Cited
UNITED STATES PATENTS
2,275,433   3/1942   Herold et al. .................. 198/219
3,168,190   2/1965   Nienstedt .......................... 198/218

*Primary Examiner*—Gerald M. Forlenza
*Assistant Examiner*—Frank E. Werner
*Attorney*—Barnes, Kisselle, Raisch & Choate

ABSTRACT: An elevator having a series of juxtaposed plates reciprocated alternately in opposite directions to elevate articles step by step from a receiving location upwardly to a delivery location. Alternate ones of the steps are interconnected by rigid bars so that they elevate and lower together. The intermediate plates are connected to an adjacent bar-driven plate by means of chains entrained around sprocket wheels so that they reciprocate in the direction counter to the bar-connected plates.

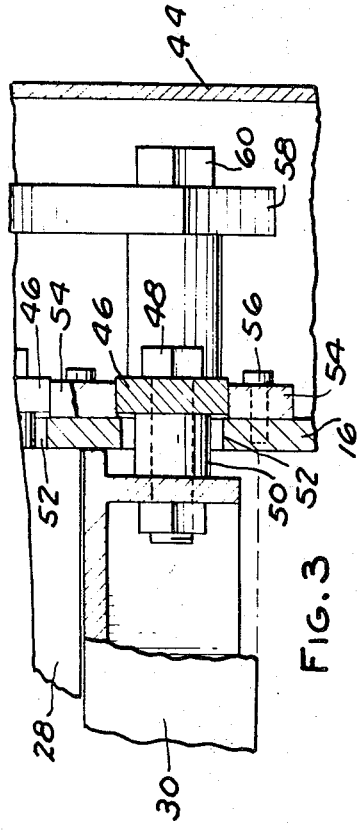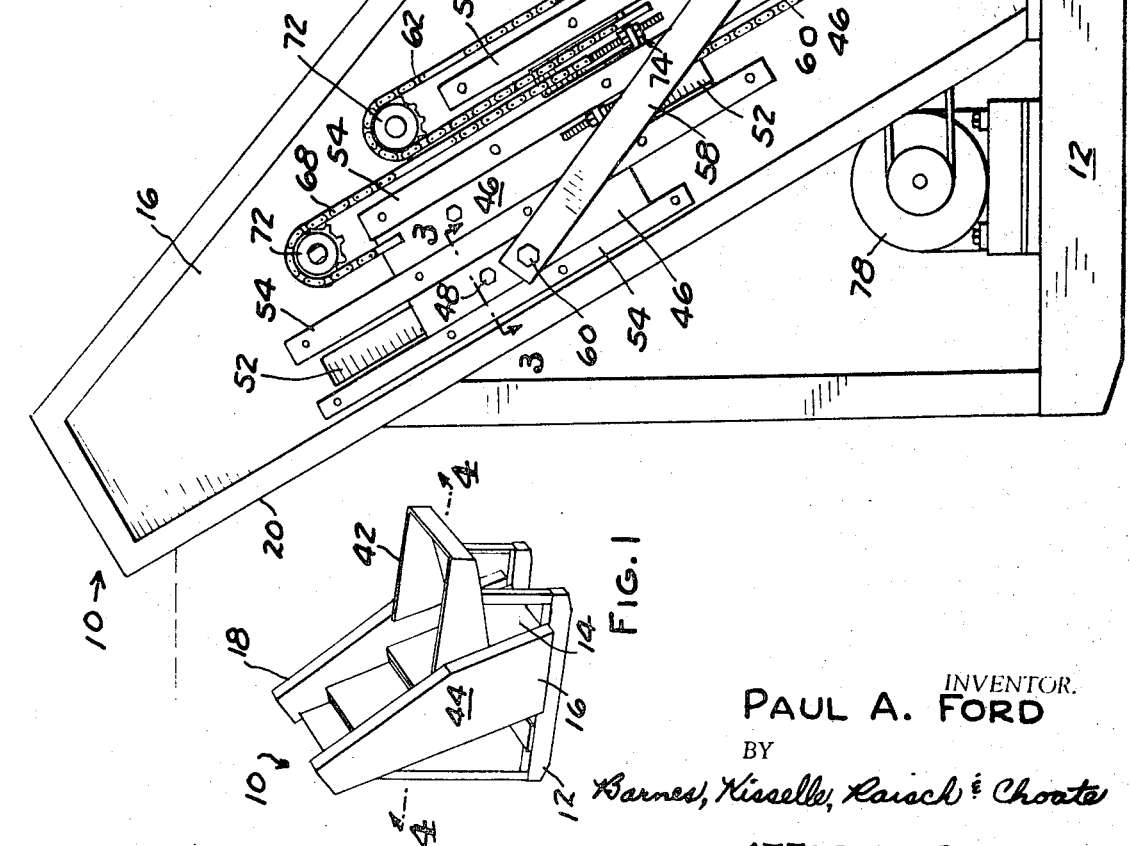

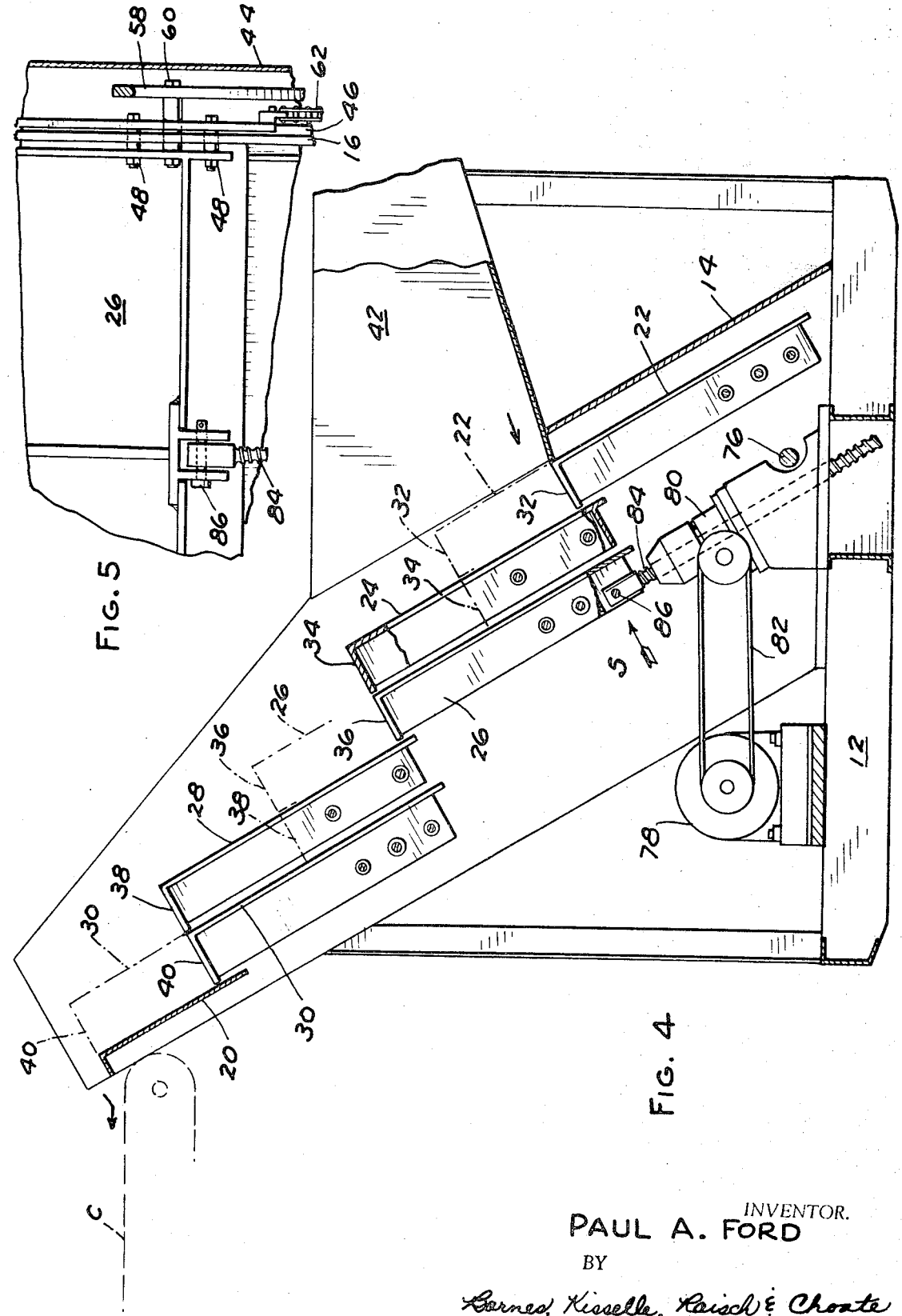

ELEVATING STRUCTURE HAVING CHAIN AND BAR DRIVEN RECIPROCATING MEANS

This invention relates generally to an elevator of the type which utilizes a series of juxtaposed plates arrayed between a receiving location and an elevated delivery location, the plates being reciprocable in alternately opposite directions for elevating articles step-by-step from the receiving location to the delivery location. An elevator of this type is disclosed in U.S. Pat. No. 3,265,195. More particularly, the invention relates to a drive mechanism for the elevator plates.

As is shown in the above-mentioned patent, it is conventional to reciprocate the plates of such an elevator by means of a series of screw shafts rotated in alternately opposite directions by interposed gearing, a nut on each screw shaft being secured to one of the reciprocating plates. Such a drive mechanism is very effective, particularly where a large speed reduction is required between the drive motor and the reciprocating plates.

However, drive mechanisms of this type have a disadvantage in that they are relatively expensive both to build and to maintain. The maintenance expense arises particularly when the mechanism is used to elevate relatively heavy loads. The loads are supported by thrust bearings on which the screw shafts operate. The standard thrust bearings for such screw shafts wear quickly under relatively heavy loads and must be replaced. This necessitates not only the provision of new thrust bearings but the cost of extensive disassembly and reassembly procedures and attendant costly down time.

The object of the present invention is to provide for such an elevator a relatively simple drive mechanism which is improved in that it is relatively inexpensive to build and further improved so that the elevator can be used over long periods of time elevating relatively heavy loads with minimal maintenance requirements.

In general, the invention is carried out by connecting alternate ones of the plates in the series, for example, the odd-numbered plates, by rigid bars so that these plates reciprocate vertically together in the same direction. The intermediate plates, for example, the even-numbered plates, are driven by chains entrained around sprocket wheels and having interconnected runs secured respectively to one of the bar-driven plates and an adjacent intermediate plate. When the bar-driven plates are moved upwardly or downwardly, the intermediate plates are moved in the counter direction; i.e., downwardly or upwardly. A reversible motor has a driving connection with one of the plates in the series. One form of the invention is shown in the accompanying drawings.

FIG. 1 is a partly diagrammatic perspective view of an elevator incorporating the present invention.

FIG. 2 is a partly diagrammatic side elevation of the elevator with a cover plate removed to illustrate the drive structure.

FIG. 3 is an enlarged scale sectional view on line 3—3 of FIG. 2.

FIG. 4 is an enlarged scale partly diagrammatic sectional view on line 4—4 of FIG. 1.

FIG. 5 is a partly diagrammatic view partly in elevation and partly in section taken in the direction of arrow 5 in FIG. 4.

Shown in the drawings is an elevating structure 10 which incorporates the present invention. The elevator has a base 12 upon which is mounted a front member 14, side members 16 and 18, and a rear member 20 which cooperate to form a housing within which a series of juxtaposed, vertically reciprocating plates 22, 24, 26, 28, and 30 are contained. The upper edges of the plates form shelves 32—40 respectively. The plates and their respective shelves are disposed at an angle to the vertical, as shown, for a purpose to be described.

A hopper 42 is mounted adjacent the front of the elevator. Each side 16, 18 has a cover plate 44 which is removable and beneath which is mounted drive mechanism for the reciprocating plates. FIG. 2 illustrates the portion of the drive mechanism mounted on side 16, cover plate 44 being removed. Similar drive mechanism is mounted on side 18. The mechanism includes a slide 46 secured to each of the reciprocating plates by bolts 48 and interposed spacers 50 which extend through slots 52 in sides 16, 18. Slides 46 are slidably contained and guided by bars 54 bolted to sides 16, 18 as at 56. Slots 52 accommodate movement of bolts 48 and spacers 50 upon vertical reciprocations of plates 22—30.

A tie bar 58 at each side 16, 18 is connected as by bolts 60 to the slides 46 for every other reciprocating plate, for example, plates 22, 26, and 30. Thus, these three plates move in the same direction during their reciprocation. Alternate plates 24 and 28 are reciprocated in a direction counter to the direction of movement of plates 22, 26, and 30. To effect such movement, a number of flexible elements such as chains 62, 64, 68, and 70 are entrained around two pairs of spaced-apart sprocket wheels 72 so that their respective interconnected runs extend parallel to the direction of movement of the plates.

The runs of chain 62 are connected respectively to the tops of the slides 46 for plates 24 and 26, and the runs of chain 64 are connected to the bottoms of these two slides. Similarly, the runs of chains 68 and 70 are connected respectively with the tops and bottoms of the slides for plates 26 and 28. At least one run of each chain 62—70 is provided with a threaded connection 74 to a slide 46 to facilitate adjusting the tension therein and adjusting the vertical position of the plate 24 or 28 connected therewith.

Two corresponding sprockets 72 at sides 16 and 18 are drivingly interconnected by means of a cross shaft 76. In the apparatus illustrated, the motor means for reciprocating plates 22—30 comprises a reversible motor 78 which drives a transmission 80 through a belt 82, the transmission having a longitudinally reciprocating output shaft 84 connected at 86 to one of the plates such as plate 26. Transmission 80 is of the ball-nut and screw type, the screw comprising shaft 84. Motor 78 and transmission 80 are mounted on frame 12 beneath the reciprocating plates and between sides 16 and 18, there being ample room at this location to accommodate the motor and transmission.

Transmission 80 is of a type commercially sold under the trademark "Jackuator" and being available in various sizes and capacities so that a transmission of adequate capacity can be selected to meet the load requirements of elevators 10 of different sizes. As will be apparent from the drawings, however, different types of transmissions could be used and could be operably connected with the elevator plates at any one of a number of locations such as the sprockets, cross shaft 76, etc.

A pair of limit switches 88 and 90 are provided in the circuitry for motor 78, and these limit switches are tripped by a finger 92 mounted on one of the vertically reciprocating parts such as tie bar 58 (FIG. 2).

In use, it may be assumed that a supply of articles to be elevated has been placed in hopper 42 and that plates 22—30 are in the solid-line position of FIG. 4. A number of the parts slide gravitationally onto shelf 32 at the top of the lowermost plate 22. Motor 78 is actuated to elevate shaft 84, thereby elevating plate 26, tie bar 58, and plates 22 and 30. As plate 26 elevates, intermediate plates 24 and 28 are lowered by chains 62. When plates 22, 26, and 30 reach their upward position and plates 24 and 28 reach their downward position as shown in dotted lines in FIG. 4, the articles elevated by shelf 32 slide gravitationally onto shelf 34 at the top os plate 24.

Also, at the dotted-line position illustrated, finger 92 trips limit switch 88 to halt movement of the plates and reverse the direction of motor 78. The plates then return to their solid-line position of FIG. 4 at which additional articles from hopper 42 slide onto shelf 32, and the articles elevated by shelf 34 slide gravitationally onto shelf 36 at the top of plate 26. Finger 92 trips limit switch 90 to again halt movement of the plates and to reverse motor 78. As the cycle repeats, the articles on shelf 36 are successively transferred to shelf 38 at the top of plate 28 and then to shelf 40 at the top of plate 30. When shelf 40 elevates to its dotted-line position of FIG. 4, the articles slide gravitationally out of the elevator and are delivered to other equipment or apparatus such as a conveyor C (FIG. 4).

The drive mechanism comprising slides 46, tie bar 58, chains 62, and their respective sprockets is relatively inexpensive to build and to maintain. The mechanism is compact so that it can conveniently be installed adjacent the sides of the elevator. Nevertheless, this mechanism is very strong and capable of lifting relatively heavy loads over long periods of operation without failure or malfunction. Tie bars 58 rigidly maintain the relative position and angular orientation of elevator plates 22, 26, and 30. The relative position and angular orientation of intermediate plates 24 and 28 are readily adjustable as necessary by adjusting the effective lengths of the runs of chains 62—70. This is done by adjusting the threaded connections 74 between the chain runs and the plates to which they are attached.

I claim:

1. In an elevator having a series of juxtaposed plates arrayed between a receiving location and an elevated delivery location and being reciprocable in alternately opposite directions for elevating articles step-by-step toward said delivery location, improved drive structure for said plates which comprises:
  a bar connected with two of said plates so that said two plates move in the same direction during their reciprocation;
  another plate in said series being disposed between said two plates;
  flexible means entrained around support means and having a plurality of interconnected runs connected respectively with one of said two plates and with said other plate;
  said runs extending generally parallel to the direction of movement of said plates;
  said flexible means, responsive to movement of said one plate connected therewith in one direction, being effective to move said other plate in the opposite direction; and
  reversible motor means operably connected for reciprocating said plates in said opposite directions.

2. The structure defined in claim 1 wherein said bar is disposed at an angle to the direction of movement of said plates.

3. The structure defined in claim 2 wherein said angle is nonperpendicular.

4. The structure defined in claim 1 wherein said flexible means comprises two flexible elements entrained around supports which are spaced apart generally in the direction of movement of said plates, the runs of one element being connected with upper portions of said one plate and other plate, the runs of said other element being connected with lower portions of said one plate and other plate.

5. The structure defined in claim 1 wherein said motor means is operably connected with said one plate.

6. The structure defined in claim 1 wherein there are five of said plates comprising from one end of said series to the other first, second, third, fourth, and fifth plates:
  said two plates comprising the first and third plates, and said other plate comprising said second plate, said bar also being connected with said fifth plate;
  a second flexible means being entrained around second support means having a plurality of interconnected runs connected respectively with said third plate and with said fourth plate; and
  said second flexible means responsive to movement of said third plate in one direction being effective to move said fourth plate in the opposite direction.

7. The structure defined in claim 6 wherein said motor means is operably connected with said third plate.

8. The structure defined in claim 7 wherein said bar is disposed at a nonperpendicular angle to the direction of movement of said plates.

9. The structure defined in claim 8 wherein the connections between said bar and plates and between said flexible elements and plates are at the side edges of said plates.

10. The structure defined in claim 6 wherein the first and second said flexible means each comprises a pair of flexible elements:
  the two elements of each pair being entrained around supports which are spaced apart generally in the direction of movement of said plates;
  the runs of the elements of one pair being connected respectively with upper portions of said second and third plates and lower portions of said second and third plates; and
  the runs of the elements of the other pair being connected respectively with upper and lower portions of said third and fourth plates.

11. The structure defined in claim 1 wherein said bar and flexible means and their respective connections with said plates are adjacent the side edges of said plates:
  there being a second said bar and flexible means so disposed and connected with the opposite edges of said plates; and
  said flexible means comprising chains and said support means therefor comprising sprocket wheels, a cross-shaft between two of said sprocket wheels, a said motor means being operably connected to drive said cross-shaft.